July 4, 1950

B. ROSE ET AL 2,513,969

PROTECTIVE DEVICE

Filed April 27, 1949

INVENTORS
Bernard Rose and
BY  Richard L. Rose,
Daniel G. Cullen.
Attorney

Patented July 4, 1950

2,513,969

UNITED STATES PATENT OFFICE 2,513,969

PROTECTIVE DEVICE

Bernard Rose and Richard L. Rose, Detroit, Mich.

Application April 27, 1949, Serial No. 89,867

4 Claims. (Cl. 119—143)

This application discloses a cage for protecting the head of an animal of the quadruped family, and it will be understood that the term "animal" as used herein refers only to a quadruped, such as a dog, or cat, or horse, etc.

It is a particular aim and object of the present invention to provide means forming a protective cage around the head of an animal whereby the animal's head is protected against shock due to bumps against and direct contact with outside objects. The device is particularly useful where the animal has received a head, face, neck or eye injury. The device herein disclosed has proven particularly useful as a protective cage around the head of a blind dog.

The device is so constructed as to be carried by the dog or animal in a manner not to interfere with the normal functioning and habits of the animal. The cage is so formed as to be supported by a removable saddle or girdle around the body of the animal and the connection between the cage and the saddle is so formed that the cage can instantly and easily be removed from the saddle, in case of emergency, merely by being pulled forwardly from the saddle and similarly can be applied instantly and easily to the animal simply by being moved without further manipulation rearwardly onto the saddle.

In addition, the device is so constructed as to protect the animal from objects forward and sidewise and above and in back of the head, but the bottom surface of the cage is left completely open whereby the animal may move his head as desired towards the ground as limited by the head encircling portion of the cage.

Further aims and objects of the present invention will presently be understood upon reference to the appended drawing, to be read in connection with the attached specification.

Figure 1:
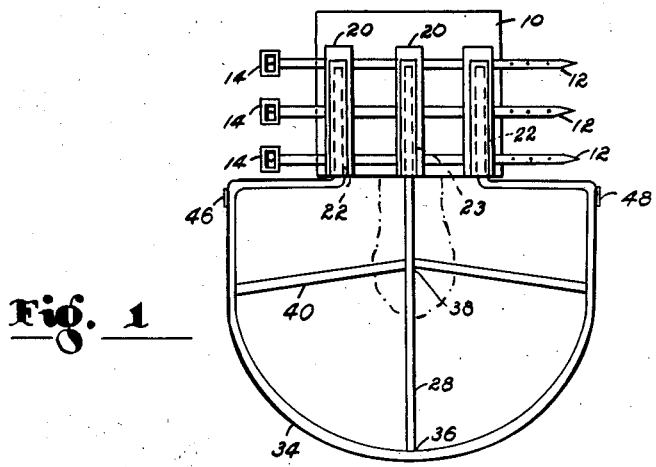
Fig. 1 is a top plan view of the protective cage with the saddle shown in conjunction therewith and ready to be applied to the head of the animal.
Figure 2:
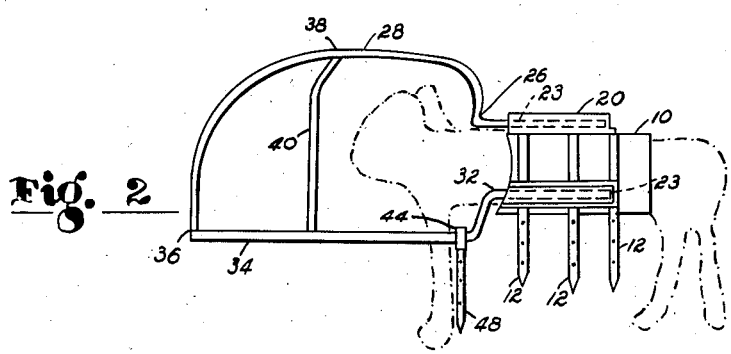
Figs. 2 and 3 are respectively side elevation and rear elevation views of the device.
Figure 3:
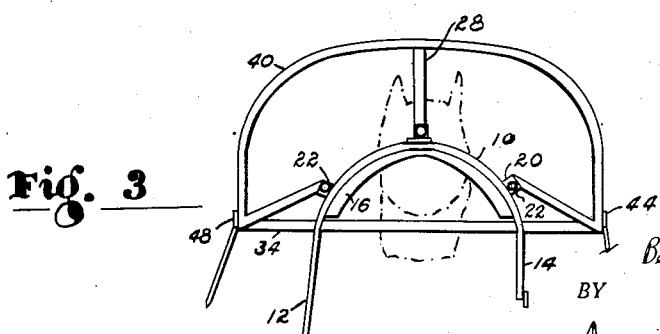

Referring now to the drawing, it will be observed that the drawing shows a saddle 10 adapted to be strapped around the body of an animal by means of straps comprising tongues 12 and buckles 14, with a heavy pad 16 between the saddle and the back or upper portion of the animal's body.

The saddle is provided with members 20 formed with longitudinally extending sockets 22 and 23 which are arranged to open forwardly or towards the animal's head. These sockets extend longitudinally, and in the embodiment shown there are three sockets, socket 23 at the upper central line of the saddle and the other two sockets 22, on the sides of the saddle.

Into the top socket 23 is fitted the rod-like end 26 of a top protective member 28 of the cage and into the side sockets 22 are fitted the rod-like ends 32 of a horizontal, peripheral encircling member 34 of the cage, spaced considerably from the animal's head. The forward and lowermost portion of the top member 28 is secured at 36 to the forwardmost portion of the member 34 and the uppermost point 38 of the top member 28 is connected by transverse top members 40 to the side portions of the encircling member 34 at points 42 whereby the members 28, 34 and 40 together form a protective cage which protects the animal's head from all directions except directly underneath the animal's head or nose.

The cage can be observed to be removably mounted and supported on the saddle 10 in a manner whereby the cage can be removed from the saddle instantly merely by pulling it forwardly out of the saddle. Similarly, the cage can be applied to the saddle easily merely by fitting the rearwardly extending rods thereof into the forwardly open saddle sockets.

If desired, however, the cage and saddle may be applied to an animal as a unit and, similarly, removed from the animal as a unit, but in emergencies the cage can be removed separately and instantaneously from the saddle as described, without removing the saddle from the animal.

The cage is free of any members under the animal's head or nose so as not to interfere with the normal habits and functions of the animal.

However, the portion 36 of the cage is sufficiently forward of the animal's nose so that when the animal subconsciously lowers its head towards the ground, that portion 36 will strike the ground and stop the animal's head from reaching the ground, except where the animal moves its head further relatively of the cage by an extraordinary motion, which should be permitted to the animal, but which the animal will exercise only rarely and then consciously rather than subconsciously.

The members of the cage are intended to be heavily padded with resilient material, such as sponge rubber, secured thereto in any desirable manner, as by winding it around the members, to minimize shock to the animal by the bumping of the cage against outside objects. Such padding may be applied to all of the portions of the cage with the exception, of course, of the rod-like ends 26 and 32 which are fitted into the sockets 22 of the saddle 10.

Bumping of the cage against objects, rather than loosening the support of the saddle for the cage, enhances it by pushing the cage rearwardly into the saddle sockets.

A cage constructed as herein disclosed has proven extremely useful to give comfort and protection to an animal such as a blinded dog. It has been found that the dog has accustomed himself readily to the cage and has welcomed it and has found it useful to overcome shocks to it that occurred without the cage being applied to its head.

It is anticipated that a cage such as here constructed can be useful with animals other than dogs and to protect the heads of animals when these animals have injuries to their heads, eyes, or other portions.

Now having described the protective cage herein disclosed, reference should be had to the claims which follow.

1. Means forming a protective cage around the head of an animal comprising a saddle or girdle strapped around the body of the animal in back of its head, said saddle having longitudinally extending sockets formed therein and opening towards the animal's head, and a cage considerably larger than the animal's head and formed with rearwardly extending rods removably fitted into the forwardly opening sockets of the saddle whereby the latter removably mounts the cage and permits the cage to be removed from the saddle instantly and merely by pulling it forwardly out of the saddle, and permits the cage to be applied to the saddle easily merely by fitting the rearwardly extending rods thereof into the forwardly open saddle sockets, said cage having a horizontal peripheral member surrounding and remote from and at the level of the animal's nose, and a top member overlying the animal's nose, and extending rearwardly from the forward portion of the horizontal member, with the peripheral member formed with two of the rods and the top member formed with a third one of the rods.

2. Means forming a protective cage around the head of an animal comprising a saddle or girdle strapped around the body of the animal in back of its head, said saddle having longitudinally extending sockets formed therein and opening towards the animal's head, and a cage considerably larger than the animal's head and formed with rearwardly extending rods removably fitted into the forwardly opening sockets of the saddle whereby the latter removably mounts the cage and permits the cage to be removed from the saddle instantly and merely by pulling it forwardly out of the saddle, and permits the cage to be applied to the saddle easily merely by fitting the rearwardly extending rods thereof into the forwardly open saddle sockets, said cage having a horizontal peripheral member surrounding and remote from and at the level of the animal's nose, and a top member overlying the animal's nose, and extending rearwardly from the forward portion of the horizontal member, with the peripheral member formed with two of the rods and the top member formed with a third one of the rods, the members of the cage being heavily padded with resilient material to minimize shock to the animal by bumping of the cage against outside objects.

3. Means forming a protective cage around the head of an animal comprising a saddle or girdle strapped around the body of the animal in back of its head, and a cage of such size as to be spaced a considerable distance from the animal's head and formed with rearwardly extending rods secured to the saddle whereby the saddle mounts the cage, said cage having a horizontal peripheral member surrounding and remote from and at the level of the animal's nose, and a top member overlying the animal's nose, and extending rearwardly from the forward portion of the horizontal member, said cage being open at the bottom with the peripheral member formed with two of the rods and the top member formed with a third one of the rods, the forwardmost portion of the peripheral member being well forward of the animal's nose.

4. Means forming a protective cage around the head of an animal comprising a saddle or girdle strapped around the body of the animal in back of its head, said saddle having longitudinally extending sockets formed therein and opening towards the animal's head, and a cage considerably larger than the animal's head and formed with rearwardly extending rods removably fitted into the forwardly opening sockets of the saddle whereby the latter removably mounts the cage and permits the cage to be removed from the saddle instantly and merely by pulling it forwardly out of the saddle, and permits the cage to be applied to the saddle easily merely by fitting the rearwardly extending rods thereof into the forwardly open saddle sockets, said cage having a horizontal peripheral member surrounding and remote form and at the level of the animal's nose, and a top member overlying the animal's nose, and extending rearwardly from the forward portion of the horizontal member, with the peripheral member formed with two of the rods and the top member formed with a third one of the rods, the forwardmost portion of the peripheral member being well forward of the animal's nose.

BERNARD ROSE.
RICHARD L. ROSE.

REFERENCES CITED

The following references are of record in the file of this patent:

UNITED STATES PATENTS

| Number | Name | Date |
| --- | --- | --- |
| 1,511,339 | Hord | Oct. 14, 1924 |
| 1,769,231 | Nickell | July 1, 1930 |

FOREIGN PATENTS

| Number | Country | Date |
| --- | --- | --- |
| 111,669 | Australia | Sept. 30, 1940 |